(12) United States Patent
Buhlmeyer et al.

(10) Patent No.: US 10,479,238 B2
(45) Date of Patent: Nov. 19, 2019

(54) BACKREST WITH INTEGRATED UPPER BODY SUPPORT

(71) Applicant: GRAMMER AG, Amberg (DE)

(72) Inventors: Katja Buhlmeyer, Konigstein (DE); Erwin Haller, Birgland (DE); Michael Landshammer, Ursensollen (DE); Christian Haid, Innsbruck (AT)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 15/774,725

(22) PCT Filed: Dec. 9, 2016

(86) PCT No.: PCT/EP2016/080363
§ 371 (c)(1),
(2) Date: May 9, 2018

(87) PCT Pub. No.: WO2017/108442
PCT Pub. Date: Jun. 29, 2017

(65) Prior Publication Data
US 2018/0319294 A1    Nov. 8, 2018

(30) Foreign Application Priority Data

Dec. 23, 2015   (DE) .................... 10 2015 122 720

(51) Int. Cl.
*B60N 2/38*   (2006.01)
*B60N 2/64*   (2006.01)
*B60N 2/50*   (2006.01)

(52) U.S. Cl.
CPC .............. *B60N 2/38* (2013.01); *B60N 2/643* (2013.01); *B60N 2/508* (2013.01)

(58) Field of Classification Search
CPC .................................. B60N 2/643; B60N 2/38
USPC ....................................................... 296/65.01
See application file for complete search history.

(56) References Cited

U.S. PATENT DOCUMENTS

| 1,945,169 | A | * | 1/1934 | Walker | ..................... B60N 2/38 180/331 |
| 3,901,550 | A | | 8/1975 | Hamy | |
| 6,550,858 | B1 | | 4/2003 | Grohs et al. | |
| D521,753 | S | * | 5/2006 | Black | ....................... B60N 2/24 D6/356 |

(Continued)

OTHER PUBLICATIONS

International Search Report prepared by the European Patent Office dated Mar. 17, 2017, for International Application No. PCT/EP2016/080363.

*Primary Examiner* — Jason S Morrow
(74) *Attorney, Agent, or Firm* — Sheridan Ross P.C.

(57) ABSTRACT

The invention relates to a vehicle seat, preferably for a utility vehicle, comprising a seat part and a backrest part. The backrest part has a left portion and a right portion when viewed in the seating direction of an occupant of the vehicle seat, and a first recess is arranged on the left portion so as to extend to a first distance and a second recess is arranged on the right portion so as to extend to a second distance starting from an upper end of the backrest part in a height direction of the backrest part. The first and the second recess are mutually spaced and are continuous from a front border surface to a rear border surface of the backrest part, and the first distance has a greater value than the second distance.

19 Claims, 10 Drawing Sheets

(56) References Cited

U.S. PATENT DOCUMENTS

| | | | |
|---|---|---|---|
| 8,267,456 B2 * | 9/2012 | Murray | B60N 2/01 296/64 |
| 2016/0176315 A1 * | 6/2016 | Moore | B60N 2/0292 297/108 |
| 2017/0001540 A1 * | 1/2017 | Reif | B60N 2/146 |

* cited by examiner

BACKREST WITH INTEGRATED UPPER BODY SUPPORT

CROSS REFERENCE TO RELATED APPLICATIONS

This application is a national stage application under 35 U.S.C. 371 and claims the benefit of PCT Application No. PCT/EP2016/080363 having an international filing date of 9 Dec. 2016, which designated the United States, which PCT application claimed the benefit of German Patent Application No. 10 2015 122 720.7 filed 23 Dec. 2015, the disclosures of each of which are incorporated herein by reference.

The invention relates to a vehicle seat, preferably for a utility vehicle, comprising a seat part and a backrest part, the backrest part comprising a left portion and a right portion as seen in the seating direction of an occupant of the vehicle seat.

Drivers (also referred to below as the vehicle driver, occupant or seated person) of work machines, such as forklift trucks, very often have to spend a great deal of time driving backwards in order to cope with the tight space conditions at their workplace, in particular in a warehouse. The driver is forced to turn his head to the rear when driving in these conditions in order to minimise the restriction to their view as far as possible. As a result, drivers of the vehicle have to sit in an uncomfortable position, and in particular such that the upper body is rotated, in order to be able to see the region to the rear of the vehicle.

In this rotated sitting position, the driver of the vehicle has few options for supporting the upper body as it is ideally for forward driving that a standard vehicle seat is able to offer the best possible comfort. There is in principle the possibility of supporting the upper body to the side, however, in this way the upper body is not completely supported, but rather only at certain points. Furthermore, in standard vehicle seats, there is no comfortable option for resting the right arm either. The very poor upper body support causes the driver to tire more quickly and may also bring about long-term health problems.

The object of the present invention is therefore to provide a vehicle seat that provides the driver of the vehicle with additional support options in order to prevent the above-mentioned risks.

This object is achieved by a vehicle seat, preferably for a utility vehicle, comprising a seat part and a backrest part, the backrest part comprising a left portion and a right portion as seen in the seating direction of an occupant of the vehicle seat, and in a height direction of the backrest part, starting from an upper end of the backrest part, a first recess being arranged on the left portion so as to extend as far as a first distance, and a second recess being arranged on the right portion so as to extend as far as a second distance, the first and the second recesses being mutually spaced and being continuous from a front border surface as far as a rear border surface of the backrest part, and the first distance being of a larger value than that of the second distance.

The backrest part thus provides integrated lateral upper body support that can support the driver of the vehicle when driving backwards frequently and for long durations, in particular in utility vehicles and/or work machines. The functionality of the support is provided by the back part of the vehicle seat having a specific shape such that the two recesses in the height direction are used to comfortably rest the upper and lower arm.

The invention can therefore also be referred to as "Backwards View Support (BVS)".

In particular, a backrest part according to a design variant 1 that is suitable for supporting the right-hand side of the upper body will be described below and with reference to the drawings. Needless to say, if the backrest part is formed as a corresponding mirror image according to a design variant 2, it would also be possible to support the left-hand side of the upper body. The following embodiments are therefore not intended to be limited to the described design variant 1, but are also equivalently applicable to design variant 2.

In particular, from the front of the seat, the driver of the vehicle accordingly guides the right-hand arm first through the first recess and then through the second recess. In this respect, the edges of the first recess are an option for resting the upper arm, and the edges of the second recess are an option for resting the vehicle driver's lower arm; it is ensured in particular that the lower arm does not slip off the seat when the driver rests it on the backrest cushion.

According to a preferred embodiment, the first and/or second recesses have, at the lowest portion thereof as seen in the height direction of the backrest part, a curve that is in the shape of the arc of a circle.

The vehicle driver's experience of comfort can be once again considerably improved if the first recess is adjoined by a third recess, which, in a depth direction of the backrest part, starting from the front border surface, extends as far as a first depth arranged between the front border surface and the rear border surface, and which, in the height direction of the backrest part, starting from the first distance, extends as far as a third distance.

Said third recess thus forms a type of depression that is a type of downward extension of the first recess. Said depression allows the right-hand side of the upper body to be supported on and to comfortably lean against the backrest part if the driver of the vehicle is assuming a rotated sitting position when driving backwards for long periods of time. Said third recess is preferably not continuous, but is rather formed as far as a particular depth of the backrest part such that the upper body of the driver of the vehicle, and in particular the right-hand side of the upper body, is comfortably supported.

Additional comfort is provided by an advantageous embodiment, according to which, in a width direction of the backrest part, a first elevation is formed by the first and second recesses, a second elevation is formed by the first recess, and/or a third elevation is formed by the second recess.

The first elevation is therefore preferably arranged in an inner region of the backrest part as seen in the width direction. The second elevation is preferably arranged at a left, outer edge of the backrest part and is used to lean the back against. When driving backwards, the driver therefore does not have to use great effort to maintain the rotated position. Furthermore, the first and second elevations stabilise the vehicle driver's body when driving backwards and/or generally and laterally stabilise said driver in the event of collisions.

The third elevation is preferably arranged at a right-hand, outer edge of the backrest part and forms part of a surface for resting the vehicle driver's lower arm.

A further, fourth recess may be arranged in particular at the rear boundary of the first elevation such that, in the depth direction of the backrest part, the first elevation is continuous only as far as a particular depth, but not from the front border surface as far as the rear border surface of the backrest part. This is another option for resting the vehicle driver's arm, and in particular the portion surrounding the elbow, as comfortably as possible.

The first elevation is preferably higher than the second elevation and/or the third elevation, and/or at the same time forms the highest point of the backrest part. The second elevation is preferably higher than the third elevation.

The first and/or second recesses do not generally have to be linear as they extend through the backrest. On the contrary, by means of a suitable form of the first and/or second recesses, it can be ensured that, for example, the physiologically most desirable arrangement of the vehicle driver's right-hand arm placed in the recesses can be achieved.

It is thus in particular conceivable for a direction of a curve of the first and/or second recesses from the front border surface as far as the rear border surface to be in parallel with or at an angle to a depth direction of the backrest part.

It would be conceivable for the direction of the curve of the first recess from the front border surface as far as the rear border surface to extend to the right from a start point. It would also be conceivable for the direction of the curve of the second recess from the front border surface as far as the rear border surface to extend to the left from a start point. It would also be possible for the direction of the curve of the first recess to form an angle with the direction of the curve of the second recess, which angle is of a value in the range of from 20° to 120°, preferably from 30° to 90°, most preferably 45°, 60° or 75°.

The term "curve" can be understood to mean, for example, a line that represents a link between each midpoint of the increments formed by the recesses, for example in the depth direction and/or width direction.

It would also be possible for a width of the first and/or second recesses to at least in part remain the same, widen and/or taper from the front border surface as far as the rear border surface. In other words, the recesses may be formed having a constant width or so as to widen or narrow in the depth direction of the vehicle seat. Here, the respective width of the recess is understood to be at a particular height of the backrest, for example.

The last-mentioned embodiment also ensures that allowance is made for the anatomical features of the vehicle driver's arm. For example, the width of the first recess from the front border surface as far as the rear border surface may taper, and the width of the second recess from the front border surface as far as the rear border surface may widen, in order to follow the curve of the arm, which narrows from the shoulder towards the hand.

Furthermore, the width of the first recess may, for example, be of a value that is larger than a value of the width of the second recess as a person's upper arm generally has a larger circumference and thus requires more space than the lower arm.

According to a further preferred variant, the first, second and/or third recesses have at least in part an elliptical, parabolic, circular, curved, linear or stepped curve, or parts thereof, as seen in the width direction and/or the depth direction of the backrest part. For example, the three recesses may have a free-form shape, and/or the curve of the three recesses may each have different portions.

The same applies to a preferred embodiment of the backrest part in which the first depth and/or an overall depth of the backrest part vary in the height direction of the backrest part. For example, the first depth has a value of zero at a lower end of the third recess and then increases as far as the position of the first recess, for example continuously. It is also preferred for the overall depth of the backrest part to increase from an upper end as far as a lower end of the backrest part in the height direction.

In practice, it has also proven to be advantageous for the backrest part to be height-adjustable. In particular, it is advantageous for the backrest part to comprise a support frame that can be adjusted with regard to the dimension thereof in the height direction of the backrest part. Said support frame may comprise, for example, tubes which extend in the height direction of the backrest part, are preferably made of metal, such as steel, and form a first, stationary portion and a second portion that is movable relative to the first portion. The first portion may, for example, be connected to the seat part of the vehicle seat.

Tubes of the first portion are, for example, inserted into tubes of the second portion, and are slidable relative thereto. The support frame can thus be extended telescopically, meaning that the overall height of the backrest part is adjustable. This integrated height adjustability of the backrest part allows said backrest part to be more easily adapted to the vehicle driver's build.

The support frame is advantageously arranged within the backrest part, and none of the components of the support frame can therefore be seen and/or felt from the outside down to a lower region of the backrest part.

The mentioned design measures are intended to counteract the vehicle driver's rapid fatigue. They also prevent potential health problems.

Components made of foamed materials are generally produced if a low weight and at the same time a simple production process are intended to be achieved. Furthermore, it is possible to fill a cavity having practically any desired shape by means of the foaming process. Particularly the described embodiments of the backrest part therefore make it appear advantageous for the backrest part to comprise a foamed component having the first, second and third recesses. In particular, said foamed component may of course be connected to the second portion of the support frame such that the foamed component can move up and/or down relative to the seat part.

Needless to say, a covering made of a material, such as leather, linen or the like, may also be arranged on the foamed component. However, on account of the low thickness and flexibility of said covering, experience has shown that said covering only influences the outer contour of the backrest part, that can be defined by the foamed component, to a very small degree.

Experience has shown that for different drivers there are not only differences in build and/or stature, but also in individual strength and preferences. As has already been mentioned above, the described vehicle seat is thus intended for supporting the driver of a vehicle if the vehicle driver's left hand remains on the steering wheel while the right arm is supported by the first and/or second recesses. In this case, the right-hand side of the upper body is supported by the third recess, for example.

However, if a vehicle driver would like to steer using the right hand and instead support the left arm by means of the first and/or second recesses and the left-hand side of the upper body by means of the third recess, it is advantageous for the backrest part to be modifiable. It has been found to be in particular effective for the foamed component, in relation to a midplane between the front and rear border surface, to be symmetrical and/or to be able to be modifiable on the support frame from the front to the rear.

The tubes of the first portion of the support frame, which are inserted into tubes of the second portion and are slidable relative thereto, can advantageously be completely extended from said tubes of the second portion. In particular, the first portion of the support frame can be detached from the second portion. In this case, the foamed component having the first portion can be detached from the second portion, subsequently rotated through 180° about an axis in the height direction and reconnected to the second portion, for example.

In practice, backrest parts having at least one of the features described below have been shown to be particularly advantageous.

It is thus advantageous for a ratio of the first distance to the second distance to be of a value in the range of from 1.1 to 2, preferably from 1.2 to 1.8, most preferably 1.3.

It is also advantageous for a ratio of an overall height of the backrest part to the first distance to be of a value in the range of from 2 to 4, preferably 2.5 to 3.5, most preferably 3.2.

It is also advantageous for a ratio of a width of the left portion to a width of the right portion to be of a value in the range of from 1 to 2, preferably 1.4.

Advantageous embodiments can be found in the dependent claims.

Advantages and expediencies can be found in the following description in conjunction with the drawings, in which.

Figure 1A:
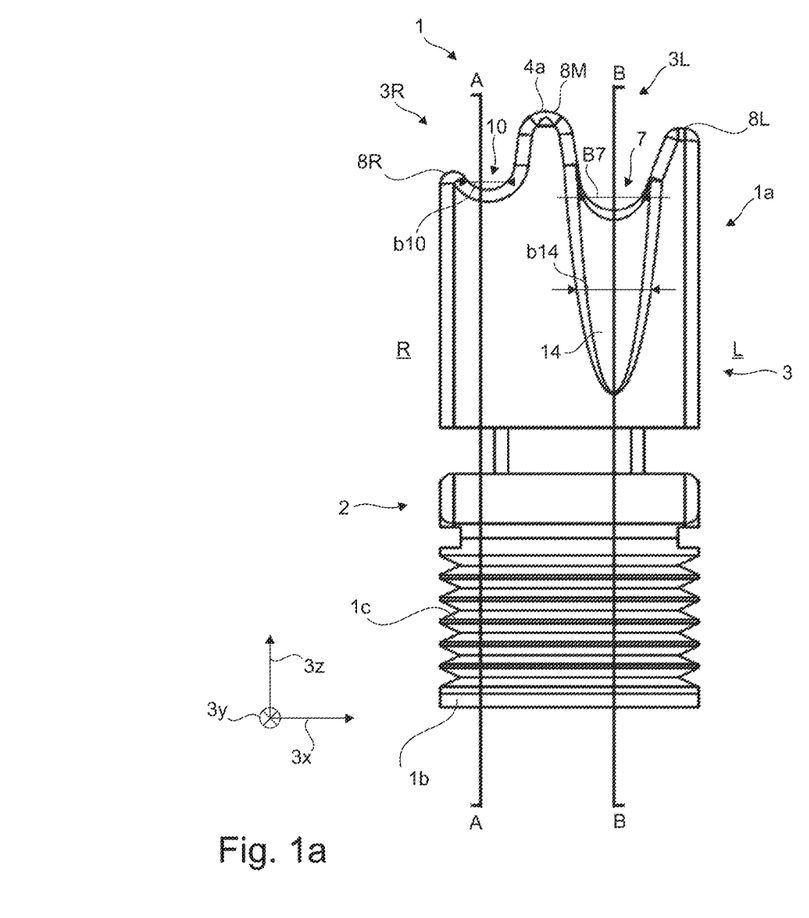
FIGS. 1a-c are standard views of a vehicle seat according to the invention occupied by a driver of the vehicle.
Figure 1B:
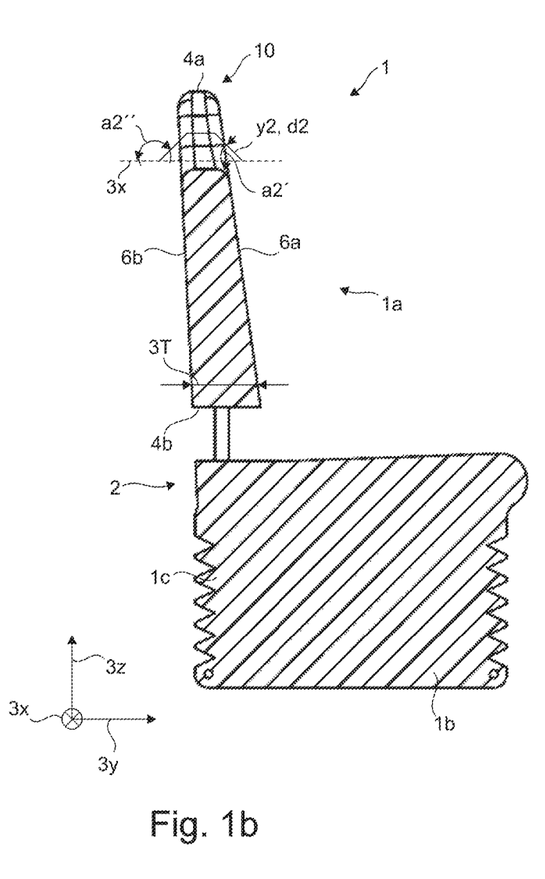
Figure 1C:
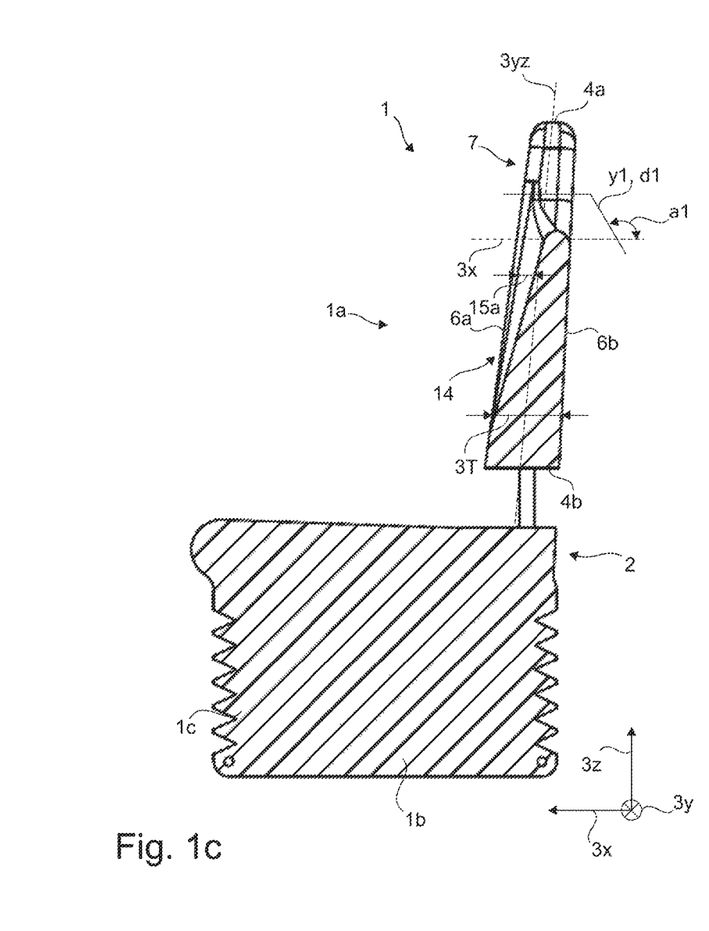

FIGS. 1a-1c show a vehicle seat 1 according to the invention which, in the present case, comprises an upper part 1a and a lower part 1b. The lower part 1b may, for example, be rigidly connected to a body (not shown) of a utility vehicle, and is connected to the upper part 1a so as to be height-adjustable and/or spring-mounted, by means of a scissor-action frame and/or a spring/damper arrangement, for example, which are concealed in the drawings by a bellows 1c.

The upper part 1a comprises a seat part 2 and a backrest part 3. Said backrest part comprises a left portion 3L and a right portion 3R as seen in the seating direction of a not shown occupant of the vehicle seat 1.

For better understanding, FIGS. 1a-3b each have a coordinates system that illustrates the height direction 3z, the depth direction 3x and the width direction 3y of the backrest part 3. Furthermore, in FIG. 1a, the left-hand side L and the right-hand side R of the vehicle seat 1 are illustrated from the view of a seated person.

In the height direction 3z of the backrest part 3, starting from an upper end 4a of the backrest part 3, a first recess 7 that extends as far as a first distance 13a (see FIG. 3a) is arranged on the left portion 3L.

Figure 3A:
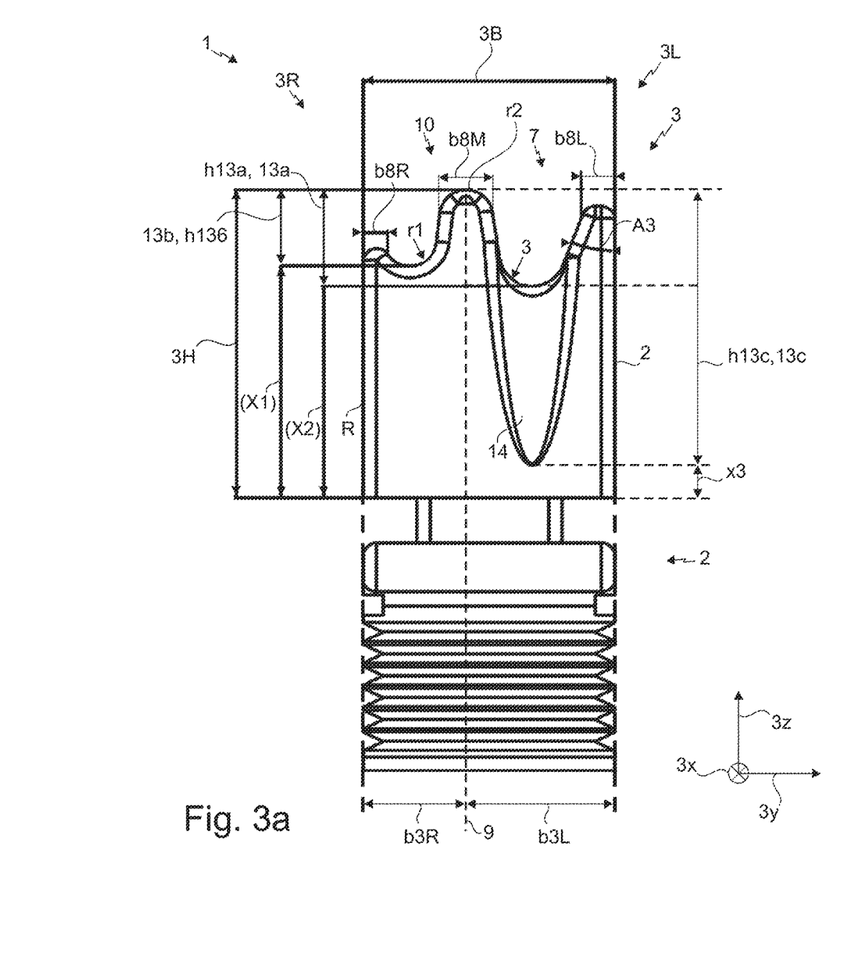
FIGS. 3a, 3b are a dimensioned front view and a rear view, respectively, of the vehicle seat according to FIGS. 1a-c.

In the height direction 3z of the backrest part 3, starting from an upper end 4a of the backrest part 3, a second recess 10 is also arranged on the right portion 3R so as to extend as far as a first distance 13b (see FIG. 3a).

The first 7 and second 10 recesses are mutually spaced. From the cross-sectional views along the lines A-A (see FIG. 1b) and B-B (see FIG. 1c) labelled in FIG. 1a, it is clear that the first 7 and second 10 recesses are continuous from a front border surface 6a as far as a rear border surface 6b of the backrest part 3.

Furthermore, in the width direction 3y of the backrest part 3, a first elevation 8M is formed by the first 7 and second 10 recesses, a second elevation 8L is formed by the first recess 7, and a third elevation 8R is formed by the second recess 10.

Furthermore, the first recess 7 is adjoined by a third recess 14. As can be seen in particular in FIG. 1c, said third recess 14 extends, in the depth direction 3x of the backrest part 3, starting from the front border surface 6a, as far as a first depth 15a arranged between the front border surface 6a and the rear border surface 6b.

It can also be seen that the first depth 15a and an overall depth 3T of the backrest part 3 vary in the height direction 3z of the backrest part 3. The overall depth 3T is accordingly labelled at an exemplary point.

The depth 15a has a curve of which the value increases as the height of the backrest part 3 rises in the height direction 3z, and is marked in FIG. 1c at an exemplary point. In particular, the gradient of this curve is constant at least in portions, preferably over at least 90%, most preferably over the entire height of the third recess, such that the depth 15a increases uniformly.

In the present case, the upper edges of the backrest part are formed by the first recess 7 and the second recess 10. The maximum width of the first recess 7 is preferably the overall width b3L of the left portion 3L, and the maximum width of the second recess 10 is preferably the width b3R of the right portion 3R.

FIGS. 1b and 1c illustrate the curve y1, y2 or the particular direction d1, d2 of the curve y1, y2 of the first 7 and second 10 recesses from the front border surface 6a as far as the rear border surface 6b of the backrest part 3 in relation to the depth direction 3x thereof.

Here it is shown that, in the present case, the first curve y1 has a first portion and a second portion, the first portion extending at an angle a1 to the depth direction 3x, and the second portion extending in parallel with the depth direction 3x of the backrest part 3.

Furthermore, the second curve y2 has first, second and third portions. The second portion again extends in parallel with the depth direction 3x of the backrest part 3. The first and third portions extend at an angle a2', a2", respectively, to the depth direction 3x.

On account of the present free-form shapes, the first 7 and second 10 recesses have different portions as seen in the width direction 3y of the backrest part 3. In the present case, some of said portions are either linear or curved. In the present case, the third recess 14 has a curve that represents part of an ellipse.

FIGS. 2a-2e show the vehicle seat 1 according to the invention, together with a seated person or vehicle driver 11 who is driving backwards and would thus like to support the upper body 18 by means of the backrest part 3 as intended. In FIGS. 2a-2e, the driver 11 of the vehicle is transparent so that the relevant parts of the seat 1 and in particular the backrest part 3 remain visible.

Figure 2A:
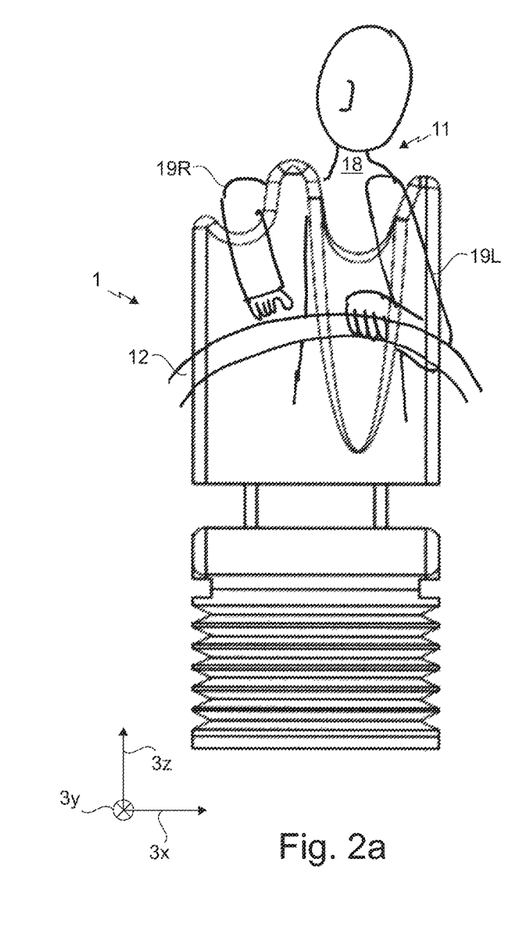
FIGS. 2a-e are a front view and two cross-sectional views of the vehicle seat according to FIGS. 1a-c.
Figure 2B:
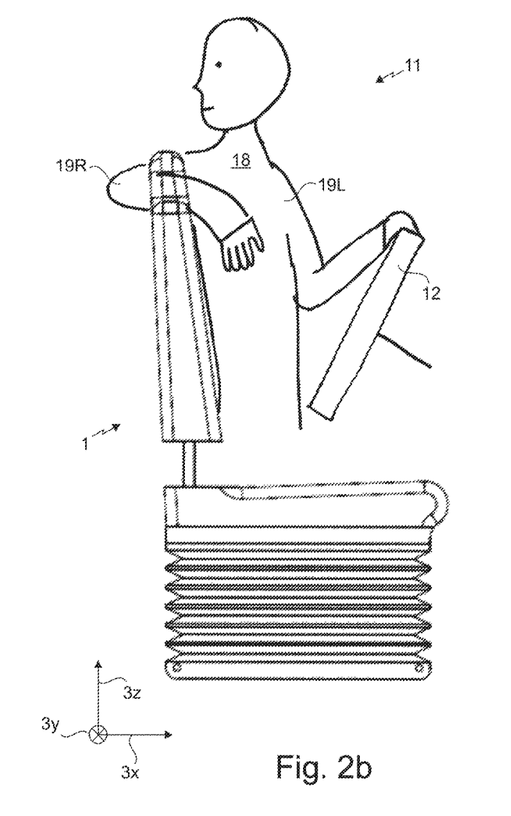
Figure 2C:
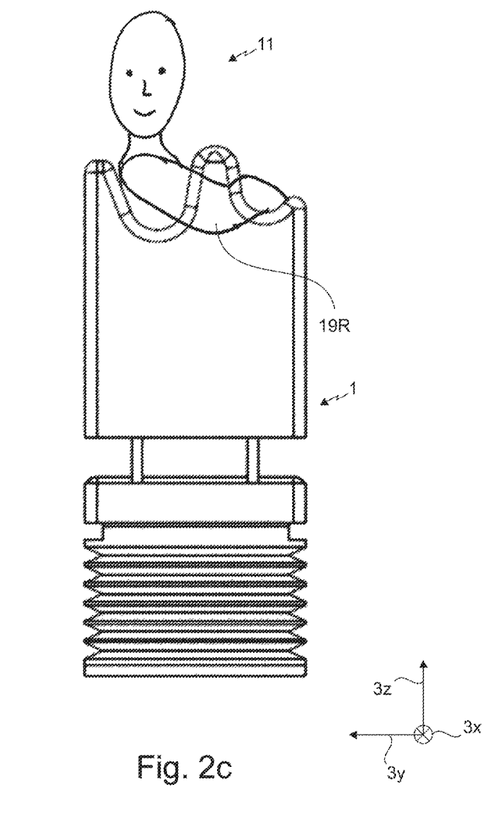
Figure 2D:
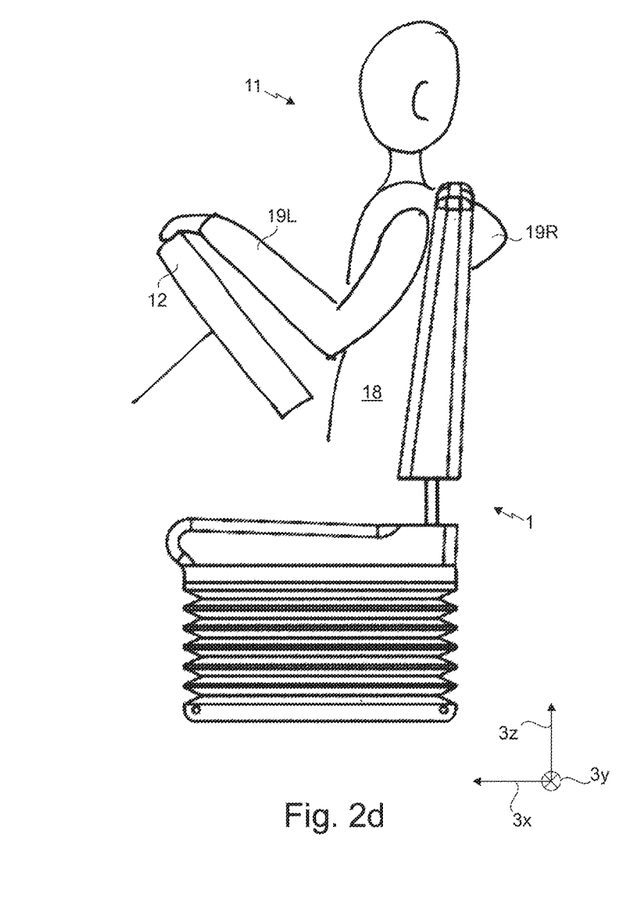
Figure 2E:
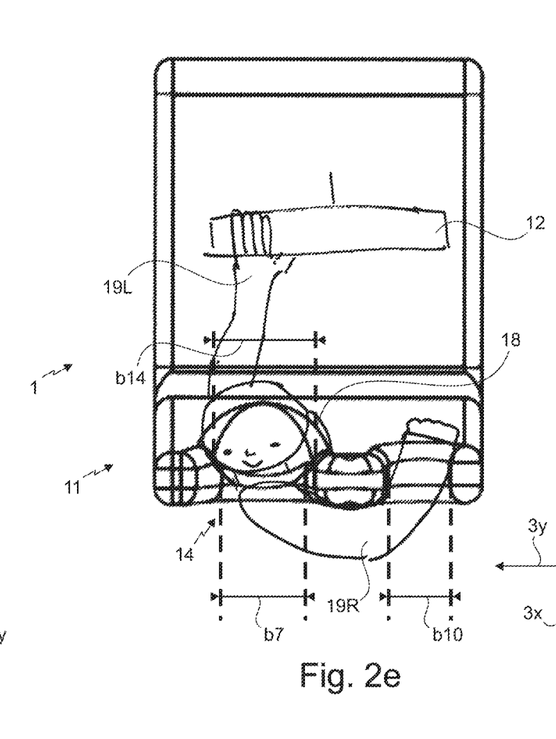

The driver 11 of the vehicle is using the left hand of the left arm 19L to grip a steering wheel 12 of the vehicle 1, while the upper region of the right arm 19R is guided through the first recess 7, and the lower region of said arm is guided through the second recess 10 (see in particular FIG. 2c and FIG. 2e). This provides an optimum option for supporting the right arm 19R.

In addition, the right-hand side of the upper body 18 of the vehicle driver 11, and in particular the portion below the armpit, comfortably and highly conveniently rest on the backrest part 3 and in particular in the depression formed by the third recess 14.

FIG. 2e also shows that the curve of the width b7 (labelled at an exemplary point) of the first recess 7 has different portions in the depth direction 3x of the backrest part 3, of which portions one is formed having a tapering width, another having a substantially constant width, and yet another having an increasing width.

It is also shown that the curve of the width b10 (labelled at an exemplary point) of the second recess 10 has different portions in the depth direction 3x of the backrest part 3, of which portions one is formed having a tapering width, another having a substantially constant width, and yet another having an increasing width.

In the present case, the width b14 (labelled at an exemplary point) of the third recess 14 increases in the depth direction 3x of the backrest part 3.

In the present case, the widths b7, b10 and b14 of the recesses 7, 10, 14 also vary in the height direction 3z of the backrest part 3 and in particular increase in the upward direction (see in particular FIG. 1a showing widths b7, b10, b14 of the recesses 7, 10, 14, exemplarily labelled).

Some of the dimensions of the backrest part 3 according to the invention are illustrated in FIG. 3a. A virtual dividing line 9 shows the junction of the left portion 3L and the right portion 3R of the backrest part 3.

The following example values are part of a preferred embodiment of the vehicle seat 1 according to the invention:
Overall height 3H of the backrest part 3: 465 mm
Overall width 3B of the backrest part 3: 380 mm
Width b3L of the left portion 3L of the backrest part 3: 222.5 mm
Width b3R of the right portion 3R of the backrest part 3: 157.5 mm
Height h13a of the first distance 13a: 145 mm
Height h13b of the second distance 13b: 115 mm
Height h13c of the third distance 13c: 412.5 mm
Value of the reference dimension x1: 350 mm
Value of the reference dimension x2: 320 mm
Value of the reference dimension x3: 52.5 mm
Dimension of the radius' r1 of the rounding of the second recess 10: 40 mm
Dimension of the radius' r2 of the rounding of the first elevation 8M: 40 mm
Dimension of the radius' r3 of the rounding of the first recess 7: 55 mm
Width b8M of the first elevation 8M: 82.5 mm
Width b8L of the second elevation 8L: 50 mm
Width b8R of the third elevation 8R: 40 mm
Angle a3 between a curve of the left-hand side L of the backrest part 3 and the portion of the first recess 7 that follows the second elevation 8L: 20°

As is apparent from the dimensions, quantitatively speaking, and from FIG. 3a, purely qualitatively speaking, the first distance 13a is of a greater value than that of the second distance 13b. In the height direction 3z of the backrest part 3, starting from the first distance 13a, the third recess 14 extends as far as the third distance 13c.

Figure 3B:
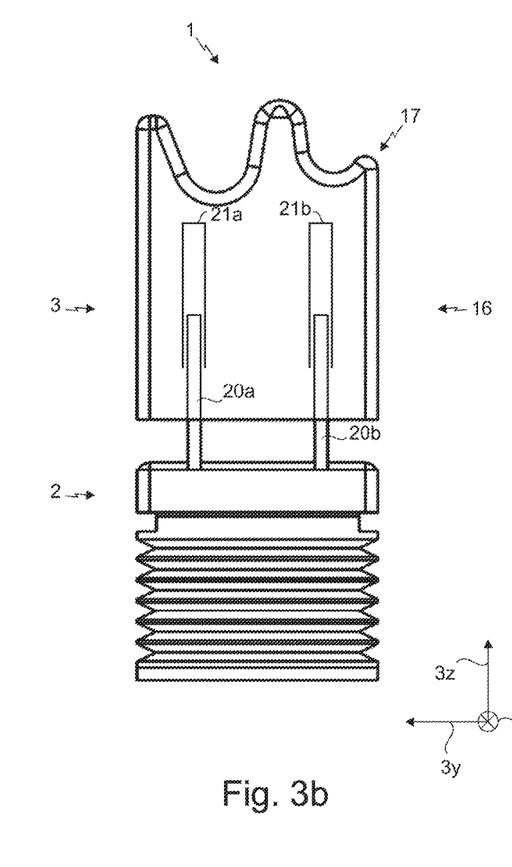
Figure 4A:
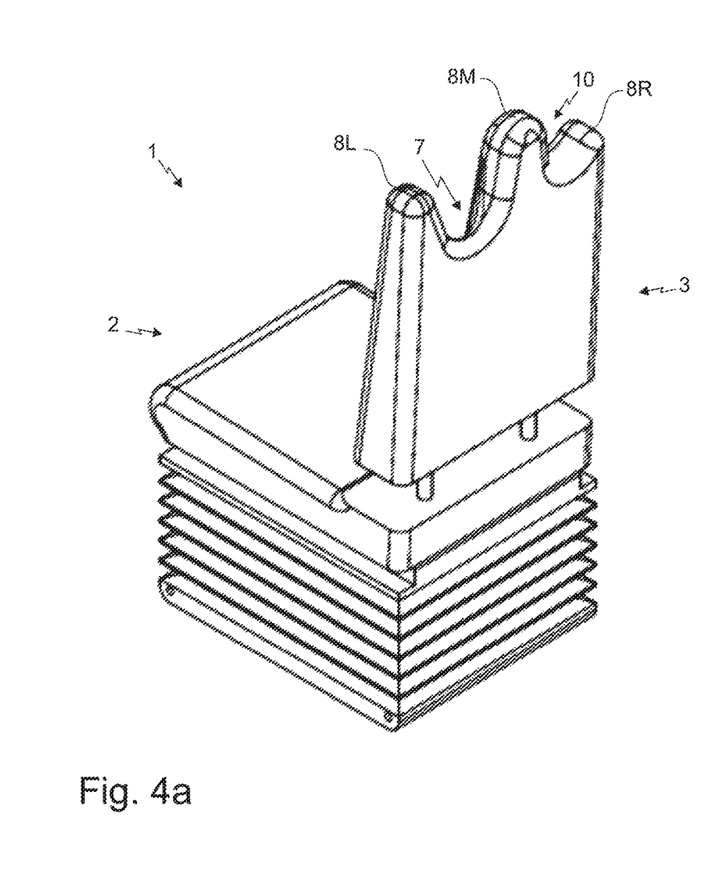
FIGS. 4a-4i are perspective views of the vehicle seat according to FIGS. 1a-c.
Figure 4B:
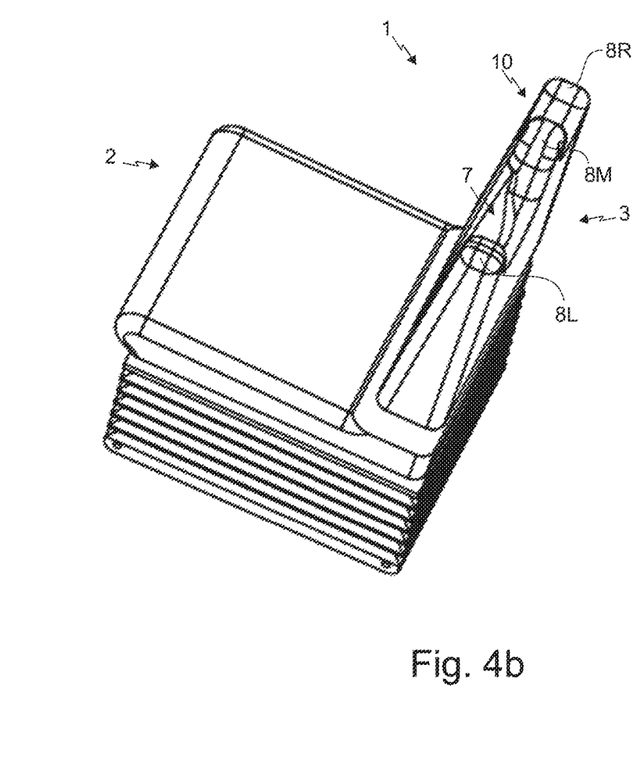
Figure 4C:
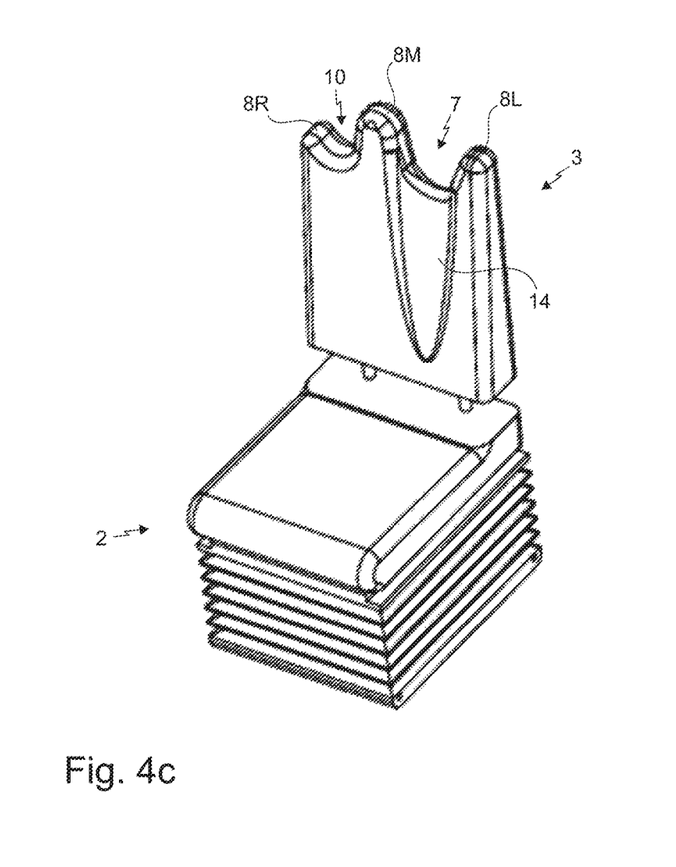
Figure 4D:
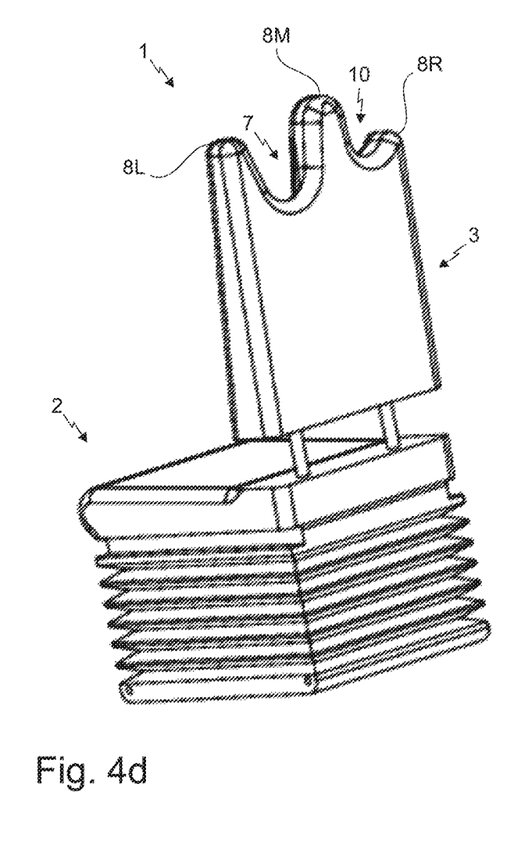
Figure 4E:
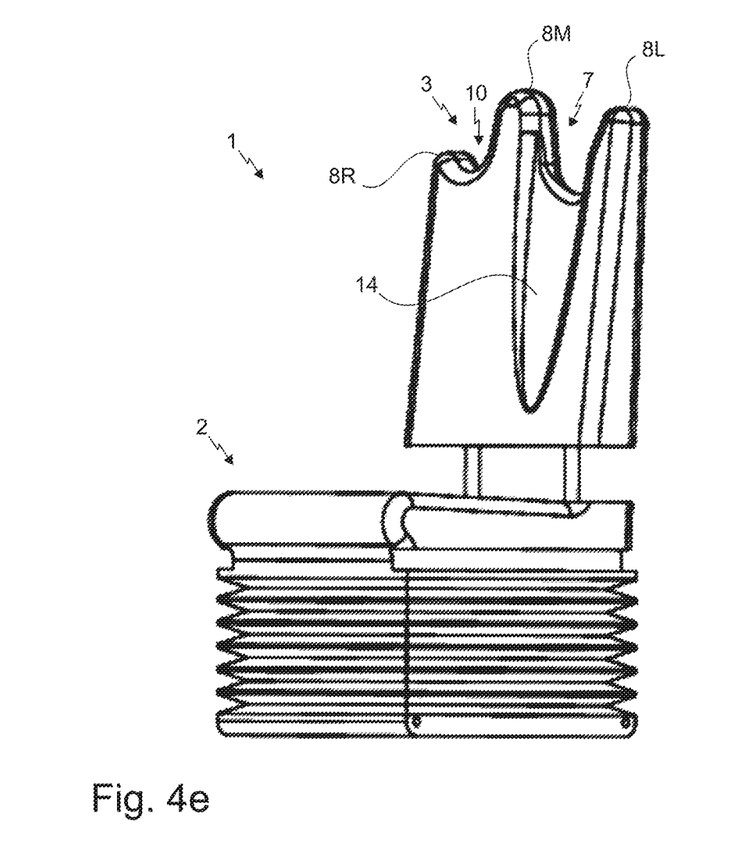
Figure 4F:
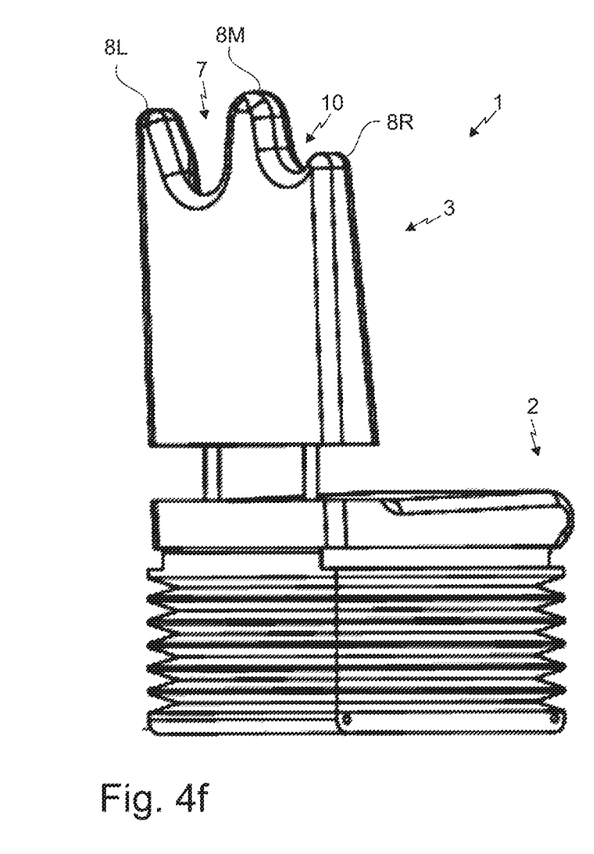
Figure 4G:
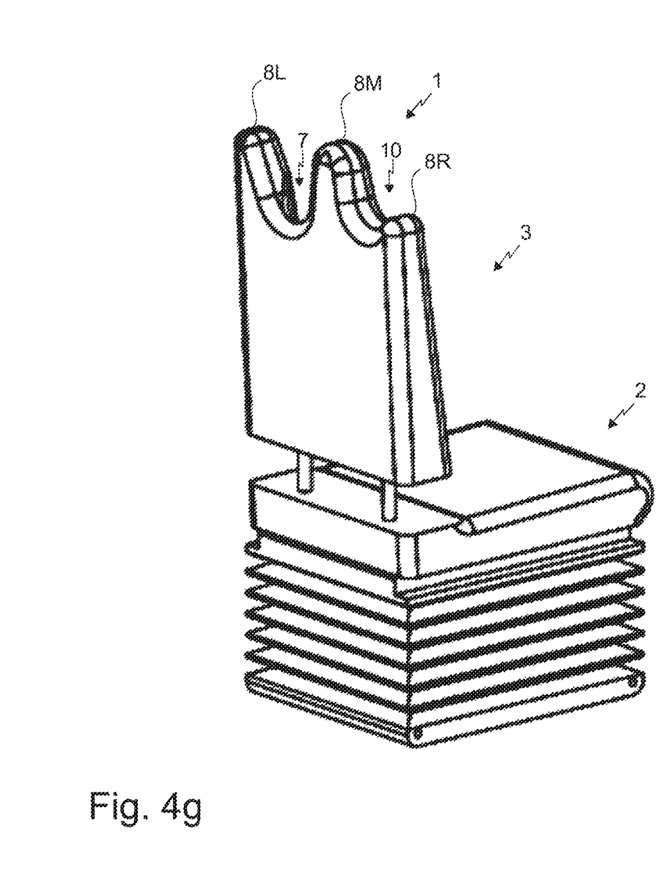
Figure 4H:
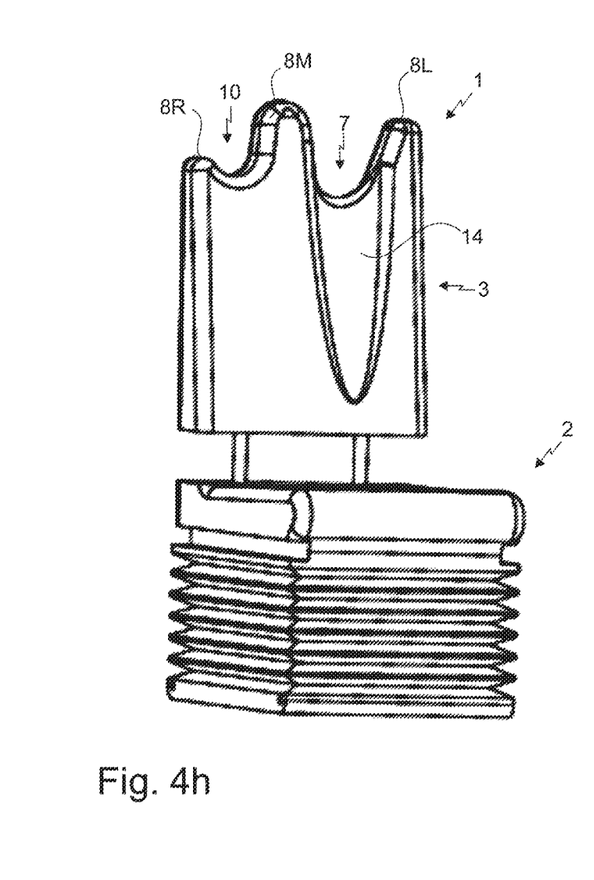
Figure 4I:
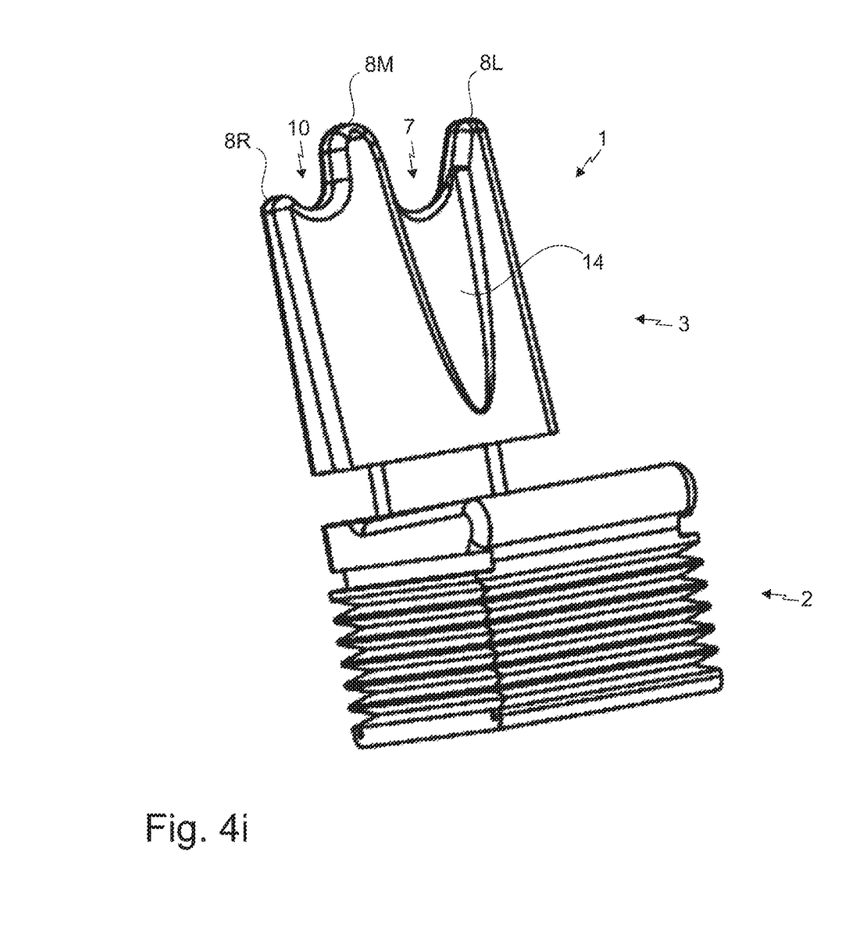

FIG. 3b shows the inside of the backrest part 3, which comprises a support frame 16 in the present case. Said support frame comprises two tube pairs consisting of tubes 20a, 20b; 21a, 21b made of hollow-cylindrical steel tubes, the first tube pair consisting of the tubes 20a, 20b forming a first stationary portion of the support frame 16, and the second tube pair consisting of the tubes 21a, 21b forming a second, movable portion of the support frame 16.

The tubes 20a, 20b; 21a, 21b extend substantially in the height direction 3z of the backrest part 3. While the first portion of the support frame 16 is rigidly connected to the seat part 2, the second portion of the support frame 16 is connected to the backrest part 3. In the present case, said backrest part comprises a foamed component 17 having the first 7, second 10 and third 14 recesses.

The tubes 20a, 20b of the first portion are, for example, inserted into the tubes 21a, 21b of the second portion, and are slideable relative thereto. The support frame 16 can thus be extended telescopically, meaning that the overall height 3H (see FIG. 3a) of the backrest part 3 is adjustable.

In the present case, the support frame 16 is arranged within the backrest part 3, the tubes 20a, 20b, 21a, 21b only being drawn for viewing purposes, and none of the components of the support frame 16 can therefore be seen from the outside down to a lower region of the tubes 20a, 20b.

It would be conceivable for the foamed component 17, in relation to a midplane 3yz (see FIG. 1c) of the backrest part 3 between the front 6a and rear 6b border surface, to be symmetrical and/or to be able to be refitted on the support frame 16 from the front to the rear. The midplane 3yz is spanned by the width direction 3y of the backrest part 3 and a line of which the points in relation to the front border surface 6a and to the rear border surface 6b have the same spacing at any one point. Said line lies in a plane spanned by the height direction 3z and the longitudinal direction 3x.

FIGS. 4a-4i are various perspective views of the vehicle seat 1 according to the invention having a seat part 2 and a backrest part 3. These figures illustrate once again the position and the curves of the first 7, second 10 and third 14 recesses and of the first 8M, second 8L and third 8R elevations.

All the features disclosed in the application documents are claimed as being essential to the invention provided that they are novel over the prior art individually or in combination.

LIST OF REFERENCE SIGNS 1 vehicle seat
1a upper part
1b lower part
1c bellows
2 seat part
3 backrest part
3B overall width
3H overall height
3L left portion
3R right portion
3T overall depth
3x depth direction
3y width direction
3z height direction
3yz midplane
4a upper end
4b lower end
6a front border surface
6b rear border surface
7, 10, 14 recesses
8L, 8M, 8R elevation
9 virtual dividing line
11 vehicle driver
12 steering wheel
13a, 13b, 13c distance
15a depth
16 support frame 17 foamed component
18 upper body
19L, 19R arm
20a, 20b, 21a, 21b tube
a1, a2, a3 angle
b3L, b3R, b7, b10, b14 width
b8L, b8M, b8R width
h13a, h13b, h13c height
L left-hand side
d1, d2 direction
r1, r2, r3 radius
R right-hand side
x1, x2, x3 distance
y1, y2 curve

What is claimed is:

1. A vehicle seat, comprising:
a seat part and a backrest part, the backrest part comprising a left portion and a right portion as seen in the seating direction of an occupant of the vehicle seat, wherein,
in a height direction of the backrest part, starting from an upper end of the backrest part, a first recess is arranged on the left portion so as to extend as far as a first distance, and a second recess is arranged on the right portion so as to extend as far as a second distance, the first and the second recesses being mutually spaced and being continuous from a front border surface as far as a rear border surface of the backrest part, and the first distance being of a larger value than that of the second distance.

2. The vehicle seat according to claim 1, wherein
the first recess is adjoined by a third recess, which, in a depth direction of the backrest part, starting from the front border surface, extends as far as a first depth arranged between the front border surface and the rear border surface, and which, in the height direction of the backrest part, starting from the first distance, extends as far as a third distance.

3. The vehicle seat according to claim 1, wherein,
in a width direction of the backrest part, a first elevation is formed by the first and second recesses, a second elevation is formed by the first recess, and/or a third elevation is formed by the second recess.

4. The vehicle seat according to claim 1, wherein
a direction (d1, d2) of a curve (y1, y2) of the first and/or second recesses from the front border surface as far as the rear border surface is in parallel with or at an angle (a1, a2', a2") to a depth direction of the backrest part.

5. The vehicle seat according to claim 1, wherein
a width of the first and/or second recesses at least in part remains the same, widens and/or tapers from the front border surface as far as the rear border surface.

6. The vehicle seat according to claim 2, wherein
the first, second and/or third recesses have at least in part an elliptical, parabolic, circular, curved, linear or stepped curve, or parts thereof, as seen in the width direction and/or the depth direction of the backrest part-.

7. The vehicle seat according to claim 1, wherein
the first depth and/or an overall depth of the backrest part vary in the height direction of the backrest part.

8. The vehicle seat according to claim 1, wherein
the backrest part is height-adjustable.

9. The vehicle seat according to claim 8, wherein
the backrest part comprises a support frame that can be adjusted with regard to the dimension thereof in the height direction of the backrest part.

10. The vehicle seat according to claim 2, wherein
the backrest part comprises a foamed component having the first, second and third recesses.

11. The vehicle seat according to claim 10, wherein,
in relation to a midplane between the front and rear border surface, the foamed component is symmetrical and/or can be refitted on the support frame from the front to the rear.

12. The vehicle seat according to claim 1, wherein
a ratio of the first distance to the second distance is of a value in the range of from 1.1 to 2.

13. The vehicle seat according to claim 1, wherein
a ratio of an overall height of the backrest part to the first distance is of a value in the range of from 2 to 4.

14. The vehicle seat according to claim 1, wherein
a ratio of a width of the left portion to a width of the right portion is of a value in the range of from 1 to 2.

15. The vehicle seat according to claim 1, wherein
a ratio of the first distance to the second distance is of a value in the range of from 1.2 to 1.8.

16. The vehicle seat according to claim 1, wherein
a ratio of the first distance to the second distance is 1.3.

17. The vehicle seat according to claim 1, wherein
a ratio of an overall height of the backrest part to the first distance is of a value in the range of from 2.5 to 3.5.

18. The vehicle seat according to claim 1, wherein
a ratio of an overall height of the backrest part to the first distance is 3.2.

19. The vehicle seat according to claim 1, wherein
a ratio of a width of the left portion to a width of the right portion is 1.4.

* * * * *